US012563175B2

(12) United States Patent
Li et al.

(10) Patent No.: US 12,563,175 B2
(45) Date of Patent: Feb. 24, 2026

(54) METHOD AND APPARATUS FOR DISPLAYING MULTI-VIEWPOINT VIDEO, DISPLAYING DEVICE, MEDIUM AND PROGRAM

(71) Applicants: BEIJING BOE DISPLAY TECHNOLOGY CO., LTD., Beijing (CN); BOE TECHNOLOGY GROUP CO., LTD., Beijing (CN)

(72) Inventors: Zhifu Li, Beijing (CN); Jinghua Miao, Beijing (CN); Mingyang Yan, Beijing (CN); Wenyu Li, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 411 days.

(21) Appl. No.: 17/926,845

(22) PCT Filed: Dec. 29, 2021

(86) PCT No.: PCT/CN2021/142664
§ 371 (c)(1),
(2) Date: Nov. 21, 2022

(87) PCT Pub. No.: WO2023/123114
PCT Pub. Date: Jul. 6, 2023

(65) Prior Publication Data
US 2024/0236291 A1 Jul. 11, 2024

(51) Int. Cl.
H04N 13/351 (2018.01)
H04N 13/354 (2018.01)
H04N 21/442 (2011.01)

(52) U.S. Cl.
CPC ......... *H04N 13/351* (2018.05); *H04N 13/354* (2018.05); *H04N 21/44218* (2013.01)

(58) Field of Classification Search
CPC ...... G03B 35/18; H04N 13/00; H04N 13/351; H04N 13/354; H04N 21/44218
See application file for complete search history.

(56) References Cited

U.S. PATENT DOCUMENTS

2012/0013651 A1 1/2012 Trayner et al.
2013/0257928 A1* 10/2013 Lee ..................... H04N 13/305
345/697

(Continued)

FOREIGN PATENT DOCUMENTS

CN 102282856 A 12/2011
CN 104469341 A 3/2015

(Continued)

*Primary Examiner* — Maria E Vazquez Colon
(74) *Attorney, Agent, or Firm* — WHDA, LLP

(57) ABSTRACT

The present disclosure provides a method and apparatus for displaying a multi-viewpoint video, a displaying device, a medium and a program, which relates to the technical field of displaying. The method includes: acquiring different viewpoint-position combinations of at least two users located within a visible area of a screen; from a predetermined multi-viewpoint-image set, screening out multi-viewpoint images corresponding to each of viewpoint-position combinations; regarding visible viewpoint images of at least the corresponding viewpoint-position combinations among the multi-viewpoint images as target viewpoint images; combining the target viewpoint images of at least two viewpoint-position combinations as video frames, to obtain the multi-viewpoint video; and displaying the multi-viewpoint video by using the screen.

9 Claims, 9 Drawing Sheets

(56) References Cited

U.S. PATENT DOCUMENTS

| | | | | | |
|---|---|---|---|---|---|
| 2014/0307068 | A1* | 10/2014 | Song | ................... | H04N 13/305 |
| | | | | | 348/54 |
| 2015/0077526 | A1* | 3/2015 | Kim | ................... | H04N 13/349 |
| | | | | | 348/51 |
| 2016/0205389 | A1* | 7/2016 | Meng | ................... | H04N 13/368 |
| | | | | | 348/54 |

FOREIGN PATENT DOCUMENTS

| | | | | |
|---|---|---|---|---|
| CN | 104536578 | A | | 4/2015 |
| CN | 104618706 | A | | 5/2015 |
| JP | 2013150103 | A | * | 8/2013 |
| JP | 2019-213127 | A | | 12/2019 |

* cited by examiner

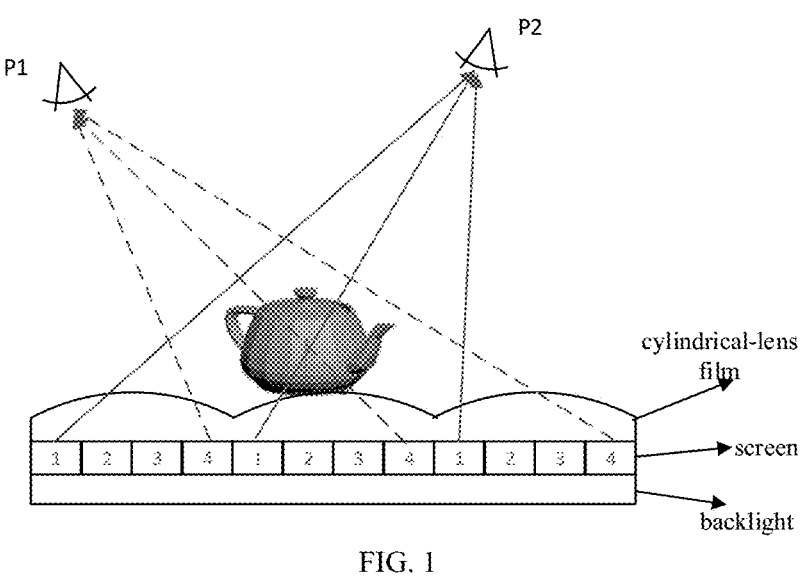

FIG. 1

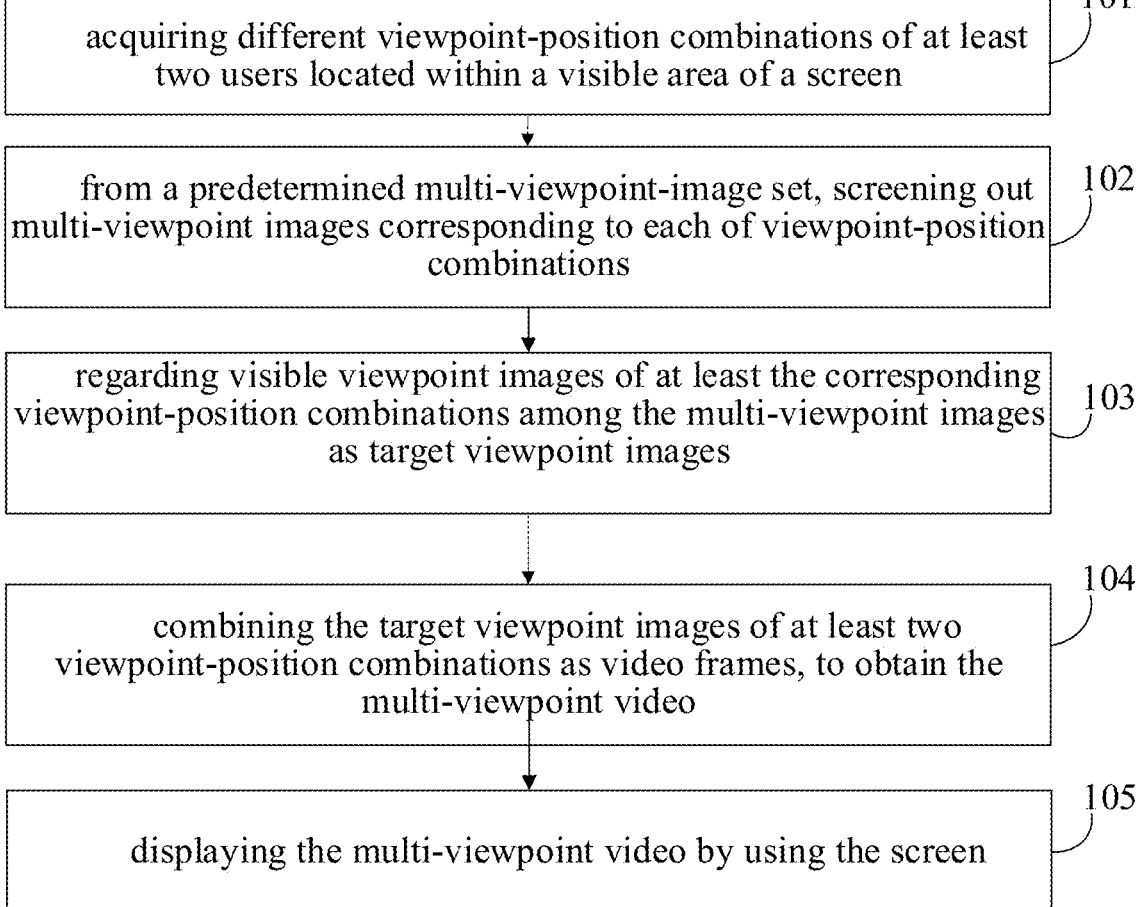

| | 101 |
|---|---|
| acquiring different viewpoint-position combinations of at least two users located within a visible area of a screen | |

| | 102 |
|---|---|
| from a predetermined multi-viewpoint-image set, screening out multi-viewpoint images corresponding to each of viewpoint-position combinations | |

| | 103 |
|---|---|
| regarding visible viewpoint images of at least the corresponding viewpoint-position combinations among the multi-viewpoint images as target viewpoint images | |

| | 104 |
|---|---|
| combining the target viewpoint images of at least two viewpoint-position combinations as video frames, to obtain the multi-viewpoint video | |

| | 105 |
|---|---|
| displaying the multi-viewpoint video by using the screen | |

FIG. 2 by using an image collecting device, acquiring a first user image within the visible area of the screen

1011 identifying human faces in the first user image, to obtain viewpoint-position combinations corresponding to eyeballs of the at least two users

1012 by using an image collecting device, re-acquiring a second user image

1013

When a similarity between the second user image and the first user image is greater than a similarity threshold, performing human-face identification to the second user image, to update the viewpoint-position combinations

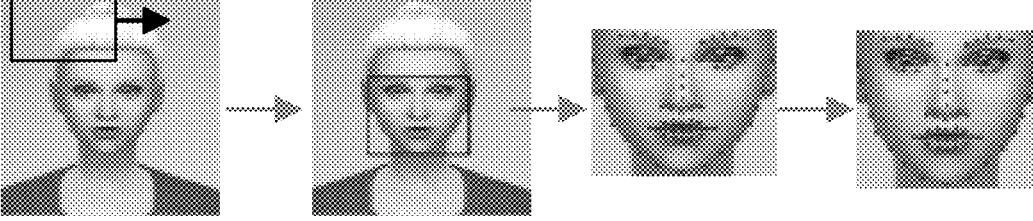

FIG. 10 processor 410 memory 420 storage space 430 for the program code   431 program code for implementing the steps of the method according to the present disclosure Computing and processing device storage unit for the program code

431' computer-readable code for implementing the steps of the method according to the present disclosure

METHOD AND APPARATUS FOR DISPLAYING MULTI-VIEWPOINT VIDEO, DISPLAYING DEVICE, MEDIUM AND PROGRAM

TECHNICAL FIELD

The present disclosure relates to the technical field of displaying and, more particularly, to a method and apparatus for displaying a multi-viewpoint video, a displaying device, a medium and a program.

BACKGROUND

The basic structure of all of the naked-eye 3D stereoscopic displays existing in the market currently is a cylindrical-lens film adhered in front of a traditional display, to, by changing the directions of propagation of the lights emitted by the sub-pixels, realize the effect of 3D displaying at particular positions. In order to improve the usage experience and the sense of reality of the watcher, some stereoscopic displaying devices may be added an eyeball tracking module.

SUMMARY

The present disclosure provides a method and apparatus for displaying a multi-viewpoint video, a displaying device, a medium and a program.

Some embodiments of the present disclosure provide a method for displaying a multi-viewpoint video, wherein the method includes:

acquiring different viewpoint-position combinations of at least two users located within a visible area of a screen;

from a predetermined multi-viewpoint-image set, screening out multi-viewpoint images corresponding to each of viewpoint-position combinations;

regarding visible viewpoint images of at least the corresponding viewpoint-position combinations among the multi-viewpoint images as target viewpoint images;

combining the target viewpoint images of at least two viewpoint-position combinations as video frames, to obtain the multi-viewpoint video; and displaying the multi-viewpoint video by using the screen.

Optionally, each of the viewpoint-position combinations includes: a left-eye viewpoint position and a right-eye viewpoint position; and the step of combining the target viewpoint images of the at least two viewpoint-position combinations as the video frames, to obtain the multi-viewpoint video includes:

determining, among the multi-viewpoint images, a left-eye viewpoint image corresponding to the left-eye viewpoint position, and a right-eye viewpoint image corresponding to the right-eye viewpoint position;

in the multi-viewpoint image, replacing a viewpoint image located at a viewpoint position on the left of the left-eye viewpoint position with the left-eye viewpoint image, and replacing a viewpoint image located at a viewpoint position on the right of the right-eye viewpoint position with the right-eye viewpoint image, to obtain a source-material multi-viewpoint image; and regarding visible viewpoint images of at least the corresponding viewpoint-position combinations in the source-material multi-viewpoint image as the target viewpoint images.

Optionally, after the step of obtaining the source-material multi-viewpoint image, the method further includes:

replacing, in the source-material multi-viewpoint image, a viewpoint image located between the left-eye viewpoint position and the right-eye viewpoint position with the right-eye viewpoint image or the left-eye viewpoint image.

Optionally, the step of regarding the visible viewpoint images of at least the corresponding viewpoint-position combinations in the source-material multi-viewpoint image as the target viewpoint images includes:

replacing a visible viewpoint image of a viewpoint-position combination other than the corresponding viewpoint-position combinations in the source-material multi-viewpoint image with a predetermined hidden image, to obtain the target viewpoint images.

Optionally, the step of combining the target viewpoint images of the at least two viewpoint-position combinations as the video frames, to obtain the multi-viewpoint video includes:

sequentially alternately combining the target viewpoint images of the at least two viewpoint-position combinations as the video frames, to obtain multi-viewpoint video frames.

Optionally, the step of sequentially alternately combining the target viewpoint images of the at least two viewpoint-position combinations as the video frames, to obtain the multi-viewpoint video frames includes:

regarding the target viewpoint image of an n-th viewpoint-position combination as an $(N+(n-1))$-th video frame, wherein N is a positive integer less than M, n is a positive integer less than m, M is a refresh rate of the screen, and m is a quantity of the viewpoint-position combinations.

Optionally, after the step of acquiring the different viewpoint-position combinations of the at least two users located within the visible area of the screen, the method further includes:

according to the quantity n of the viewpoint-position combinations, adjusting the refresh rate of the screen.

Optionally, the step of acquiring the different viewpoint-position combinations of the at least two users located within the visible area of the screen includes:

by using an image collecting device, acquiring a first user image within the visible area of the screen; and identifying human faces in the first user image, to obtain viewpoint-position combinations corresponding to eyeballs of the at least two users.

Optionally, after the step of obtaining the viewpoint-position combinations corresponding to the eyeballs of the at least two users, the method further includes:

by using an image collecting device, re-acquiring a second user image; and when a similarity between the second user image and the first user image is greater than a similarity threshold, performing human-face identification to the second user image, to update the viewpoint-position combinations.

Some embodiments of the present disclosure provide an apparatus for displaying a multi-viewpoint video, wherein the apparatus includes:

a collecting module configured for acquiring different viewpoint-position combinations of at least two users located within a visible area of a screen;

a processing module configured for, from a predetermined multi-viewpoint-image set, screening out multi-viewpoint images corresponding to each of viewpoint-position combinations;

regarding visible viewpoint images of at least the corresponding viewpoint-position combinations among the multi-viewpoint images as target viewpoint images; and combining the target viewpoint images of at least two viewpoint-position combinations as video frames, to obtain the multi-viewpoint video; and a displaying module configured for displaying the multi-viewpoint video by using the screen.

Optionally, each of the viewpoint-position combinations includes: a left-eye viewpoint position and a right-eye viewpoint position; and the processing module is further configured for:

determining, among the multi-viewpoint images, a left-eye viewpoint image corresponding to the left-eye viewpoint position, and a right-eye viewpoint image corresponding to the right-eye viewpoint position;

in the multi-viewpoint image, replacing a viewpoint image located at a viewpoint position on the left of the left-eye viewpoint position with the left-eye viewpoint image, and replacing a viewpoint image located at a viewpoint position on the right of the right-eye viewpoint position with the right-eye viewpoint image, to obtain a source-material multi-viewpoint image; and regarding visible viewpoint images of at least the corresponding viewpoint-position combinations in the source-material multi-viewpoint image as the target viewpoint images.

Optionally, the processing module is further configured for:

replacing, in the source-material multi-viewpoint image, a viewpoint image located between the left-eye viewpoint position and the right-eye viewpoint position with the right-eye viewpoint image or the left-eye viewpoint image.

Optionally, the processing module is further configured for:

replacing a visible viewpoint image of a viewpoint-position combination other than the corresponding viewpoint-position combinations in the source-material multi-viewpoint image with a predetermined hidden image, to obtain the target viewpoint images.

Optionally, the processing module is further configured for:

sequentially alternately combining the target viewpoint images of the at least two viewpoint-position combinations as the video frames, to obtain multi-viewpoint video frames.

Optionally, the processing module is further configured for:

regarding the target viewpoint image of an n-th viewpoint-position combination as an $(N+(n-1))$-th video frame, wherein N is a positive integer less than M, n is a positive integer less than m, M is a refresh rate of the screen, and m is a quantity of the viewpoint-position combinations.

Optionally, the processing module is further configured for:

according to the quantity n of the viewpoint-position combinations, adjusting the refresh rate of the screen.

Optionally, the collecting module is further configured for:

by using an image collecting device, acquiring a first user image within the visible area of the screen; and identifying human faces in the first user image, to obtain viewpoint-position combinations corresponding to eyeballs of the at least two users.

Optionally, the collecting module is further configured for:

by using an image collecting device, re-acquiring a second user image; and when a similarity between the second user image and the first user image is greater than a similarity threshold, performing human-face identification to the second user image, to update the viewpoint-position combinations.

Some embodiments of the present disclosure provide a computing and processing device, wherein the computing and processing device includes:

A displaying device, wherein the displaying device includes: a cylindrical-lens screen, a camera disposed on the cylindrical-lens screen, and a processor;

the camera is configured for photographing within a visible area of the cylindrical-lens screen, and sending a photographed user image to the processor;

the processor is configured for, based on the user image, executing steps of the method for displaying a multi-viewpoint video stated above, to obtain the multi-viewpoint video; and the cylindrical-lens screen is configured for displaying the multi-viewpoint video.

Some embodiments of the present disclosure provide a computer program, wherein the computer program includes a computer-readable code, and when the computer-readable code is executed in a computing and processing device, the computer-readable code causes the computing and processing device to implement the method for displaying a multi-viewpoint video stated above.

Some embodiments of the present disclosure provide a non-transient computer-readable medium, wherein the non-transient computer-readable medium stores the method for displaying a multi-viewpoint video stated above.

In the method and apparatus for displaying a multi-viewpoint video, the displaying device, the medium and the program according to some embodiments of the present disclosure, by, according to the acquired viewpoint-position combinations of at least two users, screening from the predetermined multi-viewpoint-image set the target viewpoint images that are visible at the viewpoint positions where the users are located, combining the target viewpoint images that are visible by the different users as the video frames to obtain the multi-viewpoint video, and displaying the multi-viewpoint video, the multiple users located at the different viewpoint positions may watch the multi-viewpoint video of a 3D effect simultaneously by using the same one screen, and the users are not required to separately watch the multi-viewpoint video by using the screen, which increases the efficiency of the usage of the multi-viewpoint video.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the prior art, the figures that are required to describe the embodiments or the prior art will be briefly described below. Apparently, the figures that are described below are embodiments of the present disclosure, and a person skilled in the art may obtain other figures according to these figures without paying creative work.

FIG. 1 schematically shows a schematic diagram of the principle of a stereoscopic displaying device according to some embodiments of the present disclosure;

FIG. 2 schematically shows a schematic flow chart of a method for displaying a multi-viewpoint video according to some embodiments of the present disclosure;

FIG. 9 schematically shows a second schematic flow chart of another method for displaying a multi-viewpoint video according to some embodiments of the present disclosure;

FIG. 10 schematically shows a fourth schematic flow chart of another method for displaying a multi-viewpoint video according to some embodiments of the present disclosure;

DETAILED DESCRIPTION

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

The structure of a naked-eye 3D stereoscopic displaying device in the related art is shown in FIG. 1, and it includes a backlight, a display, a cylindrical-lens film and so on. The cylindrical-lens film is formed by cylindrical lens connected into a row. N sub-pixels under each of the cylindrical lens form a pixel island, and the lights emitted by the pixel island pass through the column prism and propagate in a certain direction. The lights of the sub-pixels of the corresponding serial numbers under the pixel island of each of the cylindrical lens transmitting the column prism point to the same one position, which may be calculated according to the parameters of the cylindrical lens such as the pitch (surface curvature) and the arch rise. The positions that the lights point to are the area where views (viewpoints) are located. According to the pixel quantity of each of the pixel islands, the quantity of the views may be obtained. When one eye of a person is located at the position where a view is located, he may see the frame of the corresponding viewpoint. When two eyes of a person are located at the positions where different views are located, he sees a frame having a parallax, which, after processed by the brain, generates a stereoscopic effect. The clarity of stereoscopic displaying is influenced by the quantity of the viewpoints and the resolution of the frame. In order to obtain a better effect of displaying, an eyeball tracking module is introduced into stereoscopic displaying, and the device renders the frames according to the human-eye coordinates obtained by the eyeball tracking module. Introducing randomly the eyeball tracking module solves the problem to a certain extent, but that may merely be used for single-person watching, and cannot be used for simultaneous watching of multiple persons.

FIG. 2 schematically shows a schematic flow chart of a method for displaying a multi-viewpoint video according to the present disclosure. The method includes:

Step 101: acquiring different viewpoint-position combinations of at least two users located within a visible area of a screen.

Figure 3:
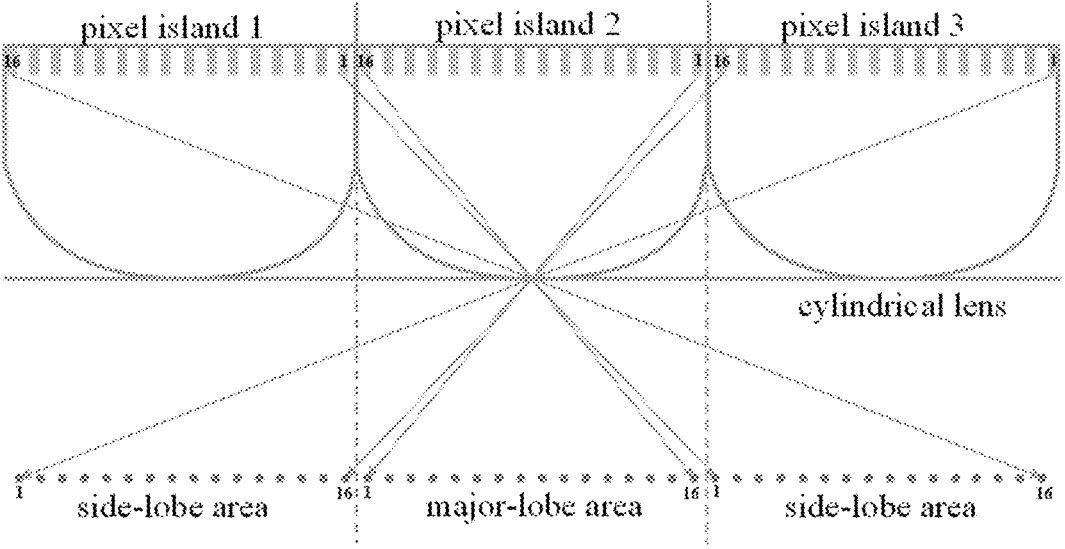
FIG. 3 schematically shows a first schematic diagram of the principle of a method for displaying a multi-viewpoint video according to some embodiments of the present disclosure.

It should be noted that the visible area of the screen refers to the spatial positions where the frame light rays emitted by the screen may be received, and is usually located within a certain area on the light exiting side of the screen. The viewpoint-position combination refers to the combination of the viewpoint positions where the left eye and the right eye of a certain user are located, and the viewpoint position refers to the position where an eye of the user watches the screen. As shown in FIG. 3, the area formed by the pixels of the pixel island 2 passing through the column prism 2 is referred to as a major-lobe area, and the areas formed by the surrounding pixel islands passing through the column prism 2 are referred to as side-lobe areas. The effect of displaying of the major-lobe area is much better than that of the side-lobe areas, and therefore the present disclosure mainly focuses on realizing multi-person eyeball tracking within the major-lobe area.

The subject implementing the present disclosure may be a stereoscopic displaying device including a screen. The stereoscopic displaying device further includes a processor for the user to implement the steps of the method for displaying a multi-viewpoint video according to the present disclosure. Furthermore, the stereoscopic displaying device may also be externally connected to or internally have a camera, and the camera may photograph the spatial positions where the visible area of the screen is located.

In an embodiment of the present disclosure, the stereoscopic displaying device, when required to play a multi-viewpoint video, may acquire from the camera a user image within the visible area of the screen, thereby performing image analysis on the positions where the left and right eyes of the user are located in the user image, to determine the viewpoint-position combination of the user. Certainly, the viewpoint-position combination may also be set by default by the system, or be inputted by the user himself when watching the multi-viewpoint video, which may be particularly configured according to practical demands, and is not limited herein.

It should be noted that some embodiments of the present disclosure focus on the case in which there are at least two users. As for the case in which there is merely one user, the techniques of performing eyeball tracking based on a single user to play a multi-viewpoint video in the related art may be referred to, and that part is not the key to the present disclosure, and is not discussed herein further.

Step 102: from a predetermined multi-viewpoint-image set, screening out multi-viewpoint images corresponding to each of viewpoint-position combinations.

Figure 4:
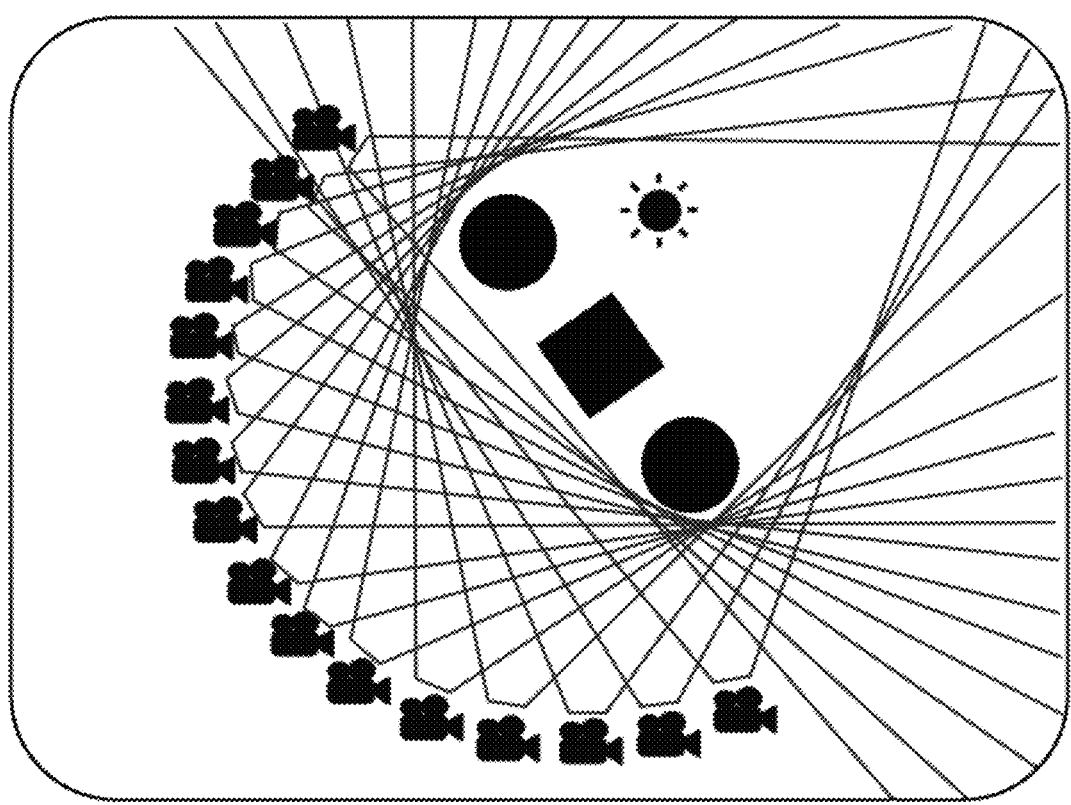
FIG. 4 schematically shows a second schematic diagram of the principle of a method for displaying a multi-viewpoint video according to some embodiments of the present disclosure.

It should be noted that the predetermined multi-viewpoint-image set refers to the set formed by the viewpoint images of the same one frame at different viewpoints. Referring to FIG. 4, the predetermined multi-viewpoint-image set may be obtained by photographing the same one object at multiple different viewpoints, and may also be obtained by post processing to the content of the frame, which may be particularly configured according to practical demands, and is not limited herein.

In an embodiment of the present disclosure, as different from the mode in the related art of, merely based on a viewpoint-position combination of a single user determined by eyeball tracking, extracting a multi-viewpoint image from a predetermined multi-viewpoint-image set and subsequently directly playing it, in the embodiment of the present disclosure, the multi-viewpoint images corresponding to the viewpoint-position combinations of each of the users among at least two users are extracted from the predetermined multi-viewpoint-image set to subsequently fuse to obtain a multi-viewpoint video that may be watched by multiple users simultaneously.

Step 103: regarding visible viewpoint images of at least the corresponding viewpoint-position combinations among the multi-viewpoint images as target viewpoint images.

In an embodiment of the present disclosure, the visible viewpoint image refers to a viewpoint image that, when the two eyes of a user are located at the viewpoint positions included in a viewpoint-position combination, the user may watch from the multi-viewpoint image displayed by the screen. For example, if a multi-viewpoint image contains viewpoint images at the viewpoint positions 1-16, and the viewpoint-position combination where the two eyes of the user are located include the viewpoint position 11 and the viewpoint position 14, then, when the screen is displaying the multi-viewpoint image, the visible viewpoint images that the user may watch are the viewpoint images at the viewpoint positions 11-14.

Further, when the target viewpoint images for the subsequent fusion of the multi-viewpoint video are being selected, it is required to use at least the visible viewpoint images that each of the users may watch as the target viewpoint images, to ensure that the displayed multi-viewpoint video may be watched by the users. Moreover, the different viewpoint images watched by all or some of the users may also be used as the target viewpoint images, wherein the difference is that, if the selected viewpoint images are fewer, the subsequent fusion of the multi-viewpoint video requires fewer image processing resource to be consumed. Therefore, the selection of the target viewpoint images may be flexibly configured particularly according to practical demands, and is not limited herein.

Step 104: combining the target viewpoint images of at least two viewpoint-position combinations as video frames, to obtain the multi-viewpoint video.

In an embodiment of the present disclosure, the target viewpoint images may be in the form of pictures, and may also be in the form of videos ordered according to time stamps. Regarding the target viewpoint images in the picture form, the target viewpoint images of the at least two viewpoint-position combinations may, as video frames, be combined randomly, or be arranged and combined one by one, or be combined according to another rule of feature combination, as long as the fused multi-viewpoint video contains the target viewpoint images of the at least two viewpoint-position combinations; in other words, when the multi-viewpoint video is being displayed by the screen, the at least two users may watch the multi-viewpoint video. Moreover, regarding the target viewpoint images in the video form, because the screen may display multiple video frames within a unit time point, for example, Is, the target viewpoint images of the different viewpoint-position combinations in the same time point may be combined as video frames to obtain the multi-viewpoint videos corresponding to different time points, thereby obtaining the multi-viewpoint videos that are continuous in the time points.

For example, if the refresh rate of the screen is 60 Hz, then the screen may display 60 frames within 1 s. When there are 2 users, the target viewpoint images corresponding to the viewpoint-position combination of one of the users may be used as odd-number video frames, and the target viewpoint images corresponding to the viewpoint-position combination of the other of the users may be used as even-number video frames, whereby both of the two users may watch the multi-viewpoint video. Certainly, if there are 3 users, the refresh rate of the screen may be adjusted to 180 Hz, and, in the same manner, the target viewpoint images corresponding to the viewpoint-position combination of the 3rd user are fused into the multi-viewpoint video as 60 video frames. Alternatively, if the resolution of the screen is un-adjustable, by allocating 20 video frames to each of the 3 users in the multi-viewpoint video, each of the users may watch the multi-viewpoint video. Certainly, the above are merely exemplary descriptions, and, as long as the fused multi-viewpoint video contains the multi-viewpoint images corresponding to the viewpoint-position combinations of different users, it may be ensured that the different users may watch the multi-viewpoint video simultaneously by using the same one screen. The particular manner of the combination of the multi-viewpoint images at the different viewpoint positions in the video frames may be configured according to practical demands, and is not limited herein.

Step 105: displaying the multi-viewpoint video by using the screen.

In an embodiment of the present disclosure, the processor of the stereoscopic displaying device, after fusing the multi-viewpoint video, may display the multi-viewpoint video by using the screen. Because the multi-viewpoint video contains the multi-viewpoint images of the different viewpoint-position combinations, all of the users corresponding to the viewpoint-position combinations may watch the multi-viewpoint video by using the screen, to feel the 3D special effect. Certainly, if a detected viewpoint-position combination changes, a multi-viewpoint video is re-fused according to the changed viewpoint-position combination, to dynamically adjust the played multi-viewpoint video.

In the embodiments of the present disclosure, by, according to the acquired viewpoint-position combinations of at least two users, screening from the predetermined multi-viewpoint-image set the target viewpoint images that are visible at the viewpoint positions where the users are located, combining the target viewpoint images that are visible by the different users as the video frames to obtain the multi-viewpoint video, and displaying the multi-viewpoint video, the multiple users located at the different viewpoint positions may watch the multi-viewpoint video of a 3D effect simultaneously by using the same one screen, and the users are not required to separately watch the multi-viewpoint video by using the screen, which increases the efficiency of the usage of the multi-viewpoint video.

Figure 5:
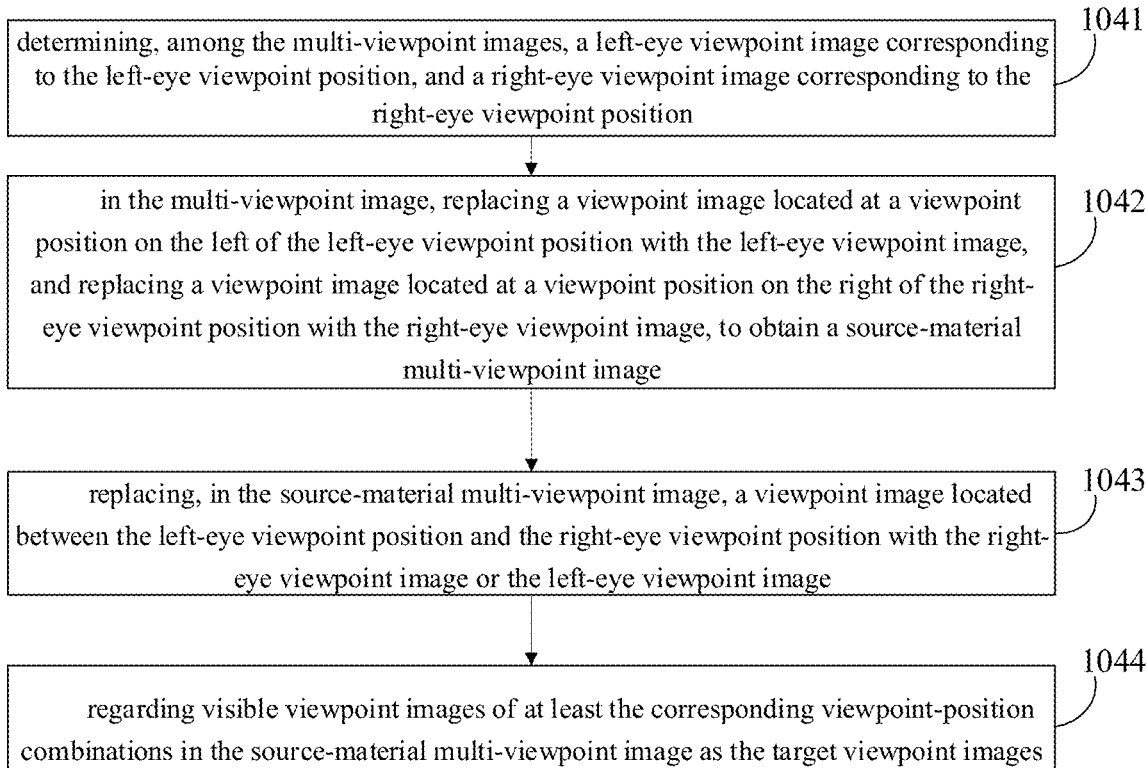
FIG. 5 schematically shows a first schematic flow chart of another method for displaying a multi-viewpoint video according to some embodiments of the present disclosure.

Optionally, each of the viewpoint-position combinations includes: a left-eye viewpoint position and a right-eye viewpoint position. Referring to FIG. 5, the step 104 may include:

Step 1041: determining, among the multi-viewpoint images, a left-eye viewpoint image corresponding to the left-eye viewpoint position, and a right-eye viewpoint image corresponding to the right-eye viewpoint position.

Figure 6:
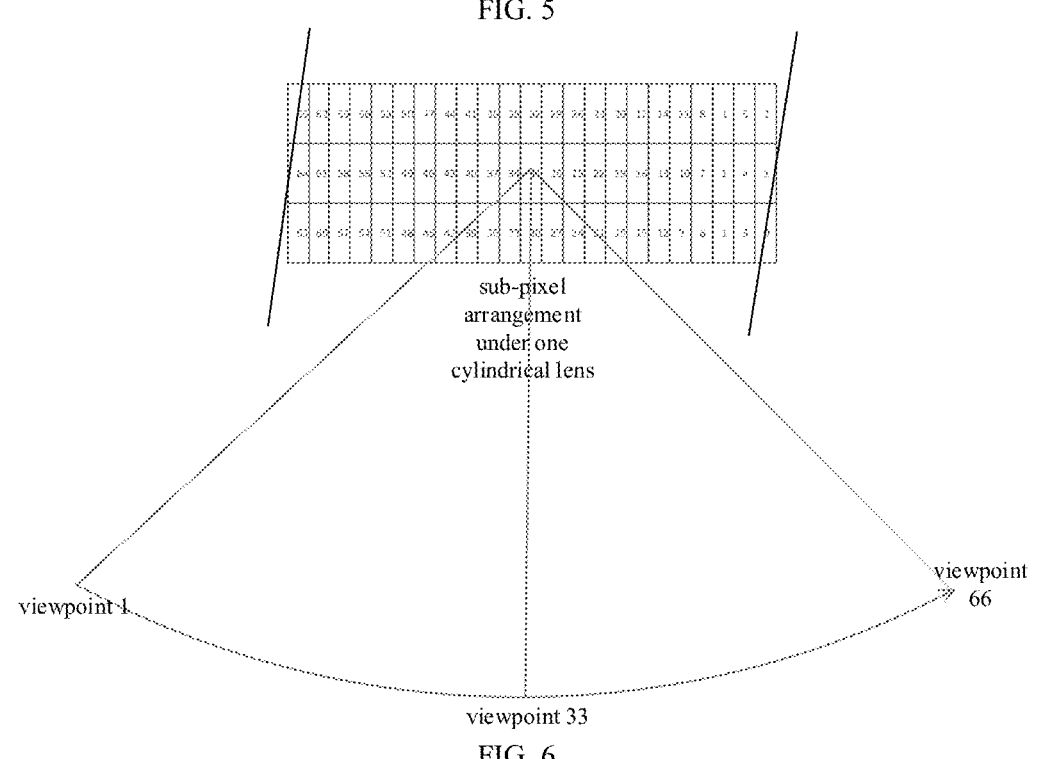
FIG. 6 schematically shows a first schematic diagram of the principle of another method for displaying a multi-viewpoint video according to some embodiments of the present disclosure.

It should be noted that screens based on cylindrical lens, in order to reduce the influence by moire, employ the mode of obliquely arranged cylindrical lens, with a slope of approximately 7°. For example, the arrangement of the sub-pixels under each of the cylindrical lens of 66 viewpoints is shown in FIG. 6. Each of the cylindrical lens covers 3 rows and 22 columns of the sub-pixels, the sub-pixels are arranged sequentially from the bottom right corner to the top left corner, and the viewpoints 1-66, after passing through the cylindrical lens, are evenly arranged in the horizontal direction. The light rays of the pixels at the corresponding position under each of the cylindrical lens, after passing through the cylindrical lens, converge in the same direction, so that when a person is located at the position corresponding to each of the viewpoints, he may see one image at that viewpoint. If pictures are photographed at a fixed viewpoint, in an ideal situation, at the position of each of the viewpoints, merely the image of the corresponding viewpoint position may be seen. However, because of factors such as the design or the process, the light rays emitted by the cylindrical lens corresponding to neighboring viewpoints of the screen have interference therebetween, and, at the viewpoint n, some images of the viewpoints n−1 and n+1 might be seen. In other words, the light rays of the surrounding pixels also enter the human eyes, and there is no ideal boundary. Although the interference may increase the brightness of the image, at the same time it results in obscureness of the column imaging.

In an embodiment of the present disclosure, taking into consideration the interference in the displaying of the multi-viewpoint video by the screen caused by the above-described interference, in the present disclosure, all of the surrounding pixels, i.e., n−1 and n+1, are replaced by the pixel n, whereby the brightness of the viewpoints may be increased without losing the perspective sense of the multi-viewpoint video.

Particularly, because what a user may watch is the viewpoint image between the viewpoint-position combination where the two eyes are located, the processor of the stereoscopic displaying device, after acquiring the multi-viewpoint images corresponding to different viewpoint-position combinations, extract from the multi-viewpoint images corresponding to each of the viewpoint-position combinations individually a left-eye viewpoint image corresponding to the viewpoint position where the left eye is located and a right-eye viewpoint image corresponding to the viewpoint position where the right eye is located.

Step 1042: in the multi-viewpoint image, replacing a viewpoint image located at a viewpoint position on the left of the left-eye viewpoint position with the left-eye viewpoint image, and replacing a viewpoint image located at a viewpoint position on the right of the right-eye viewpoint position with the right-eye viewpoint image, to obtain a source-material multi-viewpoint image.

In an embodiment of the present disclosure, assuming that a multi-viewpoint image has the viewpoint images of N viewpoint positions, the left-eye viewpoint position is Nl, and the right-eye viewpoint position is Nr, then all of the viewpoint images at the viewpoint positions 1-Nl may be replaced by the viewpoint images corresponding to the viewpoint position Nl, and all of the viewpoint images at the viewpoint positions Nr-N may be replaced by the viewpoint images corresponding to the viewpoint position Nr. Therefore, when the screen is displaying the viewpoint images that have been adjusted, because of the interference, the viewpoint image that the user watches at the neighboring viewpoint position of the left-eye viewpoint position Nl is still the viewpoint image corresponding to the viewpoint position Nl, and the same applies to Nr, which may alleviate the obscureness of the multi-viewpoint images watched by the user by using the stereoscopic displaying device caused by the interference to the largest extent, thereby increasing the clarity of the displaying of the multi-viewpoint video.

Step 1043: replacing, in the source-material multi-viewpoint image, a viewpoint image located between the left-eye viewpoint position and the right-eye viewpoint position with the right-eye viewpoint image or the left-eye viewpoint image.

In an embodiment of the present disclosure, the viewpoint images between the viewpoint positions Nl-Nr may reserve the original viewpoint images, and may also be filled by using the viewpoint image of the viewpoint position Nl or Nr, which further alleviates the obscureness of the multi-viewpoint images watched by the user by using the stereoscopic displaying device caused by the interference, thereby increasing the clarity of the displaying of the multi-viewpoint video.

Step 1044: regarding visible viewpoint images of at least the corresponding viewpoint-position combinations in the source-material multi-viewpoint image as the target viewpoint images.

In an embodiment of the present disclosure, by filling the visible viewpoint images in the source-material multi-viewpoint images of the viewpoint images on the two sides of and between the left and right viewpoint positions by using the images of the left and right viewpoint positions as the target viewpoint images for the subsequent fusion of the multi-viewpoint video, the obscureness of the multi-viewpoint images watched by the user by using the stereoscopic displaying device caused by the interference may be effectively alleviated, thereby increasing the clarity of the displaying of the multi-viewpoint video.

Optionally, the step 1044 may include: replacing a visible viewpoint image of a viewpoint-position combination other than the corresponding viewpoint-position combinations in the source-material multi-viewpoint image with a predetermined hidden image, to obtain the target viewpoint images.

In an embodiment of the present disclosure, taking into consideration that, when the user A is watching, a part of the multi-viewpoint video that he watches may be seen by the user B within the area of the viewpoint positions of the user B, then the viewpoint images corresponding to the viewpoint positions projected into the eyes of the user B may be replaced by predetermined hidden images, for example, a black frame and a dark-color frame. In the same manner, when a multi-viewpoint video that the user B may see is being displayed, the viewpoint images corresponding to the viewpoint positions projected into the eyes of the user A are set to be predetermined hidden frames. Such alternate imaging may ensure that the fluency of the frames of the multi-viewpoint video that each of the persons sees is maintained consistent, and prevents repeated changing of the viewpoints of the frames in the multi-viewpoint videos seen by the users.

Optionally, the step 104 may include: sequentially alternately combining the target viewpoint images of the at least two viewpoint-position combinations as the video frames, to obtain multi-viewpoint video frames.

In some embodiments of the present disclosure, the "sequentially alternately" refers to sequentially alternately combining the target viewpoint images of different viewpoint-position combinations as the video frames in a fixed sequence. For example, if there are target viewpoint images a and b corresponding to 2 viewpoint-position combinations, then the combining may be performed in the sequence of abab . . . ab or baba . . . ba to obtain the multi-viewpoint video. If there are target viewpoint images a, b and c corresponding to 3 viewpoint-position combinations, then the combining may be performed in the sequence of abcabc . . . abc or cbacba . . . cba or bacbac . . . bac to obtain the multi-viewpoint video. The combining of the video frames of the multi-viewpoint videos of the viewpoint-position combinations of other quantities may be done in the same manner, which may be particularly configured according to practical demands, and is not limited herein. Such a mode of sequentially alternately combining may ensure that the video frames corresponding to the different viewpoint-position combinations in the multi-viewpoint video may be distributed evenly, so as to maintain the fluency of the multi-viewpoint images of the different viewpoint-position combinations in the multi-viewpoint video to be maintained consistent to the greatest extent.

Figure 7:
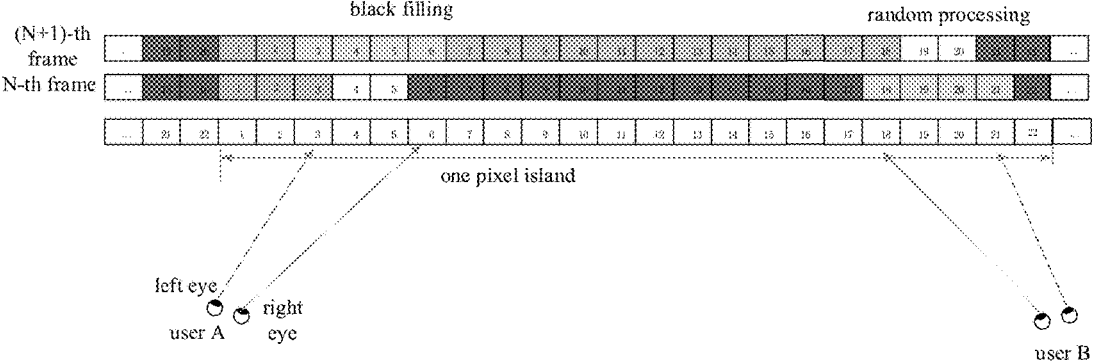
FIG. 7 schematically shows a second schematic diagram of the principle of another method for displaying a multi-viewpoint video according to some embodiments of the present disclosure.

As an example, referring to FIG. 7, if, currently, two persons A and B are simultaneously watching the stereoscopic displaying device, the viewpoint positions of their left and right eyes are individually detected, wherein the viewpoint position of the left eye of the user A is NLa, the viewpoint position of the right eye is NRa, the viewpoint position of the left eye of the user B is NLb, and the viewpoint position of the right eye is NRb. Furthermore, the refresh rate of the screen is set to be 120 Hz.

The images that A and B see are alternately rendered and refreshed, wherein if the N-th frame displays the multi-viewpoint video that the user A sees, then the (N+1)-th frame displays the multi-viewpoint video that the user B sees. Because, when the user A is watching, a part of his multi-viewpoint image is seen by the user B, the viewpoint images corresponding to the viewpoint positions projected into the eyes of the user B are set to be black frames. In the same manner, when a multi-viewpoint image that the user B sees is being displayed, the viewpoint images corresponding to the viewpoint positions projected into the eyes of the user A are set to be black frames. Such alternate imaging may ensure that the frames that each of the persons sees are of 60 Hz.

In other words, if, at the moment, a frame of the user A is being displayed, then, in the N-th video frame, all of the viewpoint positions 1-NLa are replaced by the frame of NLa, and, in the section of NRa-NMax, except that NLb-NRb are set to be black, all of the rest are replaced by the frame pixel of 6. In the same manner, if, at the moment, a frame of the user B is being displayed, then, in the section of the viewpoints 1-NLb, except that NLa-NRa are set to be black, all of the rest are replaced by NLb, all of the pixels NRb-NMax are replaced by NLb, and the contents of the pixels between NLa-NLb may maintain the original, and may also be replaced by Nlb or NRb. Wherein, NLa is 3, NRa is 6, NLb is 18, NRb is 21 and NMax is 120.

Figure 8:
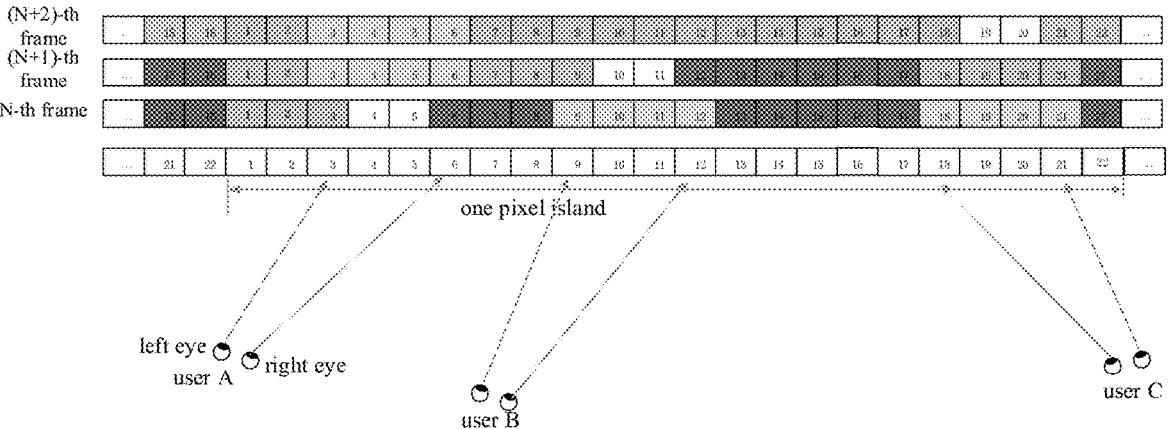
FIG. 8 schematically shows a third schematic diagram of the principle of another method for displaying a multi-viewpoint video according to some embodiments of the present disclosure.

As an example, referring to FIG. 8, if, currently, three persons A, B and C are simultaneously watching the stereoscopic displaying device, when the three users have been detected, their viewpoint-position combinations are individually detected. The viewpoint positions of the left and right eyes of the three users A, B and C are NLa and NRa, NLb and NRb, and NLc and NRc, respectively. Furthermore, the refresh rate of the screen is set to be 180 Hz.

The images that A, B and C see are alternately refreshed, wherein the N-th frame of the multi-viewpoint video displays the multi-viewpoint video that the user A sees, the (N+1)-th frame displays the multi-viewpoint video that the user B sees, and the (N+2)-th frame displays the multi-viewpoint video that the user C sees. Because, when the user A is watching, part of the multi-viewpoint images of his multi-viewpoint video are also seen by the other two users, the multi-viewpoint videos projected into the eyes of the other users are set to be black images. In the same manner, when one of the persons is watching, the pixels corresponding to the viewpoints where the other persons are located are set to be black. Such alternate imaging may ensure that the multi-viewpoint videos that each of the persons sees are of 60 Hz, to ensure the fluency of the multi-viewpoint videos.

In other words, if, at the moment, the displayed multi-viewpoint video is the multi-viewpoint video that the user A sees, then all of the viewpoints 1-NLa are replaced by the multi-viewpoint video of NLa, and, in the pixels between NRa-NMax, except that NLb-NRb, NLc and NRc are set to be black, all of the rest are replaced by the pixel of NRa. In the same manner, if, at the moment, the multi-viewpoint video that the user B sees is being displayed, in the pixels between 1-NLb, except NLa-NRa, all of the rest are replaced by NLb, and, in the pixels between NRb-NMax, except that NLc-NRc are set to be black, all of the rest are replaced by NRc. If, at the moment, the multi-viewpoint video that the user C sees is being displayed, between the viewpoints 1-NLc, except that NLa-NRa and NLb-NRb are set to be black, all of the rest are replaced by NLc, and the pixels between NRc-NMax are replaced by NRc. Such alternate imaging may ensure that the multi-viewpoint videos that each of the persons sees are of 60 Hz, to ensure the continuity of the multi-viewpoint videos. NLa is 3, NRa is 6, NLb is 9, NRb is 12, NLc is 18, NRc is 21, and NMax is 180.

Optionally, the step 104 may include: regarding the target viewpoint image of an n-th viewpoint-position combination as an (N+(n−1))-th video frame, wherein N is a positive integer less than M, n is a positive integer less than m, M is a refresh rate of the screen, and m is a quantity of the viewpoint-position combinations.

In an embodiment of the present disclosure, it is merely required to ensure that the refresh rate of the screen, i.e., the integer of the video frames that the screen may display each second, may be divided evenly by the quantity of the users, and, by regarding the target viewpoint image of the n-th viewpoint-position combination as the N-th video frame (wherein N is a multiple of n and is not a multiple of any other positive integer among 1 to M than n, N is a positive integer less than M, n is a positive integer less than m, M is the refresh rate of the screen, and m is the quantity of the viewpoint-position combinations), the target viewpoint images corresponding to the different viewpoint-position combinations may be combined to obtain the multi-viewpoint video.

Optionally, after the step 101, the method further includes: according to the quantity n of the viewpoint-position combinations, adjusting the refresh rate of the screen.

In an embodiment of the present disclosure, in order to ensure that, in the multi-viewpoint videos that each of the users watches, the frame rates of the multi-viewpoint videos that they may see are maintained equal, the refresh rate of the screen may be adjusted according to the quantity of the users, i.e., the quantity n of the viewpoint-position combinations. For example, if it is required to ensure that the refresh rate of the multi-viewpoint videos that each of the users watches is 60 Hz, when 2 users have been detected, the refresh rate of the screen is adjusted to be 120 Hz; when 2 users have been detected, the refresh rate of the screen is adjusted to be 180 Hz; and when 4 users have been detected, the refresh rate is adjusted to be 240 Hz. Currently, the maximum refresh rate of displays is 240 Hz. Certainly, the refresh rates that are supported by different screens are different and limited, and, therefore, on the precondition that the refresh rate of the multi-viewpoint videos that the users watch is maintained at a certain standard, the person quantity of the multi-person watching that the screen may support is also limited. Certainly, the refresh rate of the multi-viewpoint videos that each of the users watches may also be reduced to increase the quantity of the users that may simultaneously watch, which may be particularly configured according to practical demands, and is not limited herein.

Optionally, referring to FIG. 9, the step 101 may include:

Step 1011: by using an image collecting device, acquiring a first user image within the visible area of the screen.

In an embodiment of the present disclosure, the image collecting device may be an infrared camera of a resolution of 1920*1080 and a frame rate of 60 Hz, which may ensure that the distance between the human eyes that it may photograph and identify reaches at least 3 m. Certainly, the distance that may be photographed and identified may also be increased by increasing the resolution and the frame rate, which may be particularly configured according to practical demands, and is not limited herein.

Particularly, firstly, one frame of user image is collected. Assuming that the resolution is 1920*1080, then the picture is reduced to 800*600. An initial sliding block is provided, for example, the black block at the top left corner in FIG. 10, and the sliding block moves in the rightward and downward directions, to perform detection on human-face feature points. If a human face has been detected, the position and the size (pos, size) of the human face are marked, till the sliding block has slid to a detection completing position. All of the detected human faces are saved into a list.

Step 1012: identifying human faces in the first user image, to obtain viewpoint-position combinations corresponding to eyeballs of the at least two users.

Figure 11:
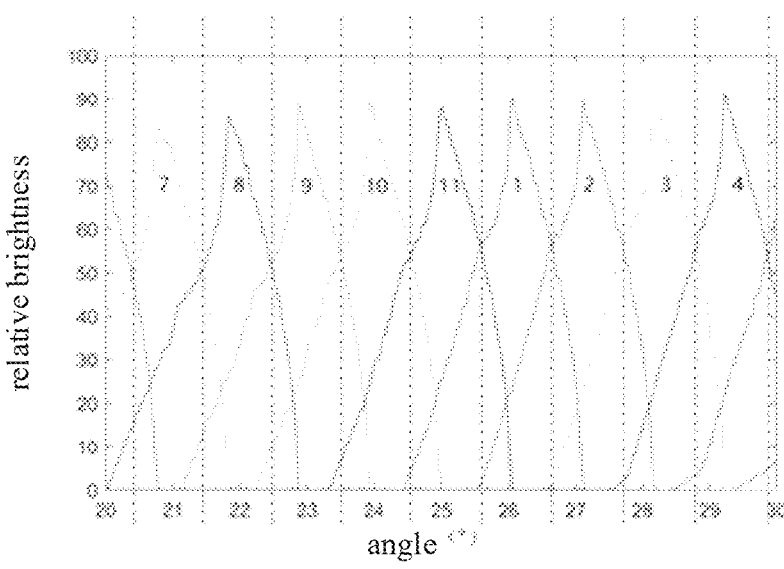
FIG. 11 schematically shows a fifth schematic flow chart of another method for displaying a multi-viewpoint video according to some embodiments of the present disclosure.
Figure 12:
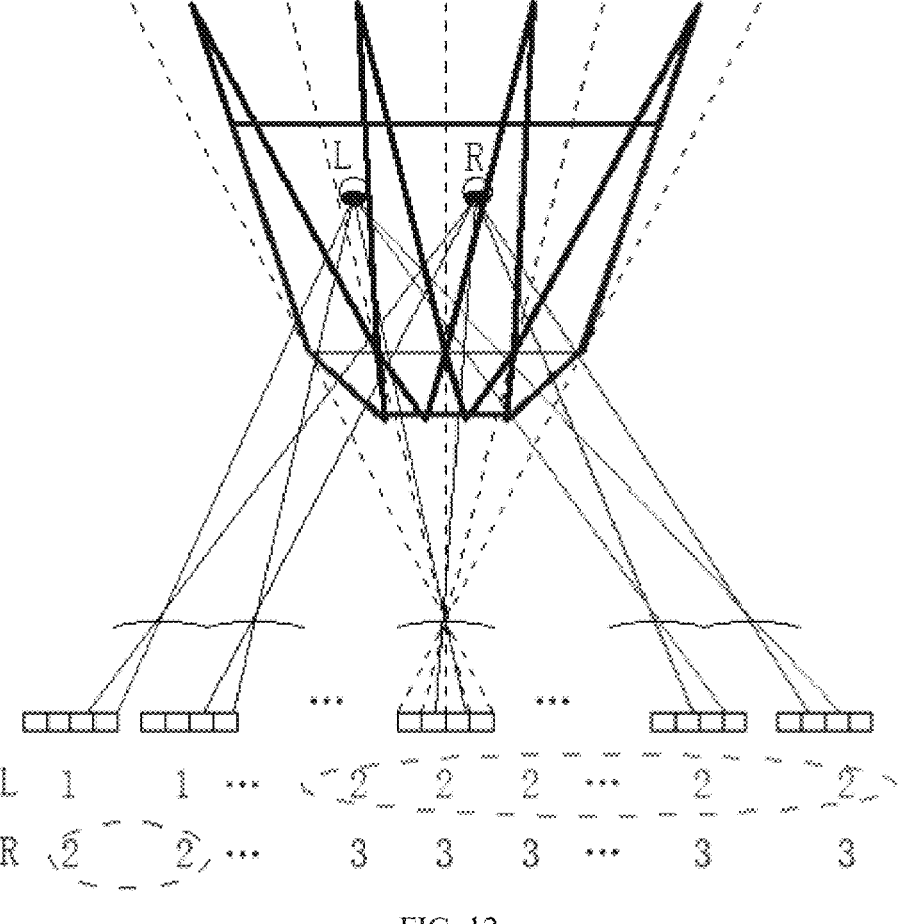
FIG. 12 schematically shows a sixth schematic flow chart of another method for displaying a multi-viewpoint video according to some embodiments of the present disclosure.

In an embodiment of the present disclosure, in order to determine the position of a viewpoint-position combination in the screen coordinate system, it is required to perform angular-spectrum analysis. As shown in FIGS. 11 and 12, a brightness distribution curve at different angles may be obtained by using an angular-spectrum measurer, a spatial-position-distribution diagram of the viewpoints may be obtained by analyzing the curve, and the data are saved, to be used in the subsequent calculation of the viewpoint positions corresponding to the human eyes.

Figures 13, 14:
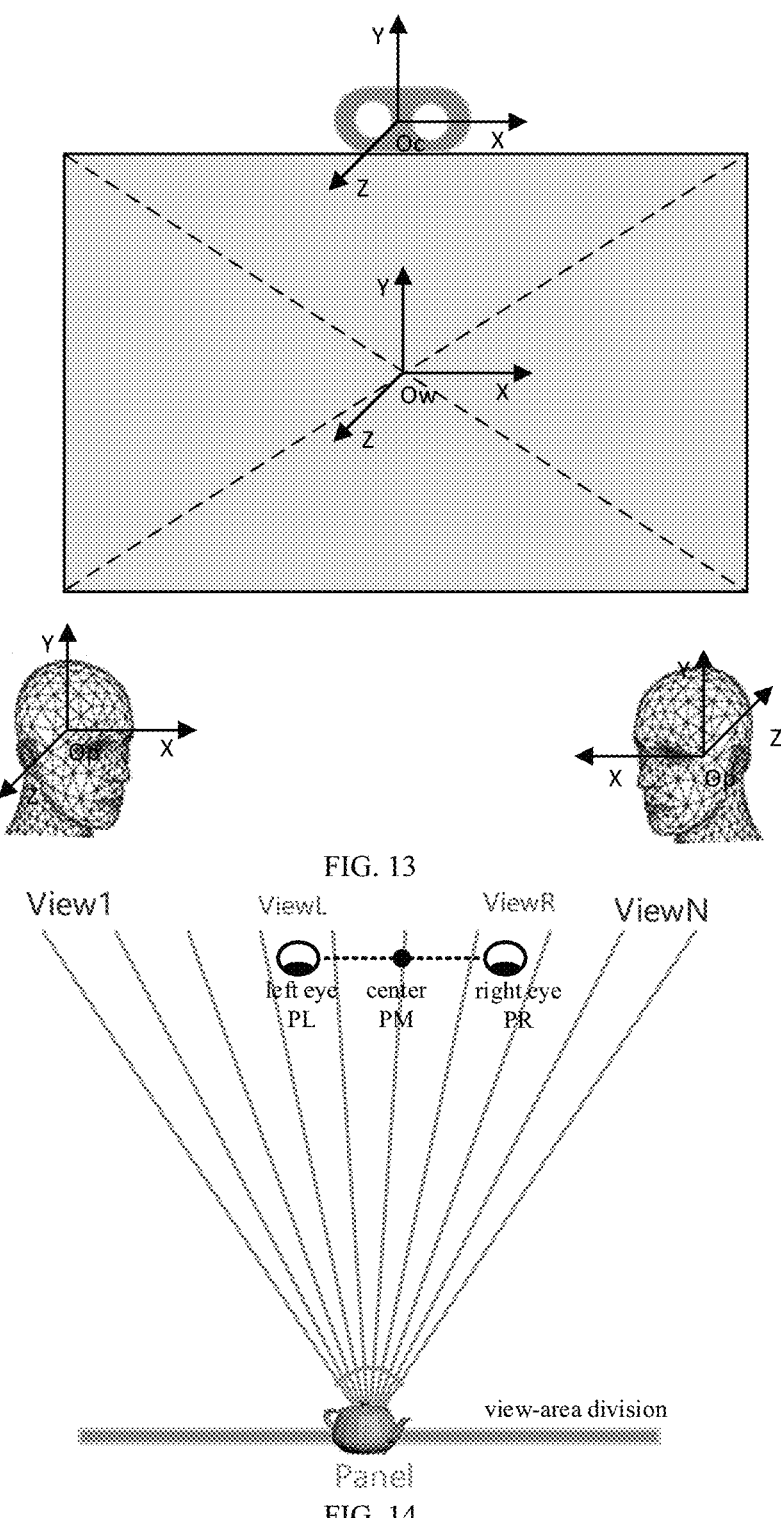
FIG. 13 schematically shows a seventh schematic flow chart of another method for displaying a multi-viewpoint video according to some embodiments of the present disclosure.
FIG. 14 schematically shows an eighth schematic flow chart of another method for displaying a multi-viewpoint video according to some embodiments of the present disclosure.

Further, FIG. 13 shows a schematic diagram of the correspondence relation of the camera coordinate system, the screen coordinate system and the human-face coordinate systems. The origin of the screen coordinate system is located at the direct center of the screen, the origin of the camera coordinate system is located at the center of the camera, and the camera is installed at the upper edge of the screen. Their corresponding coordinate-system conversion relation is: Ow=T*Oc, wherein T is the transfer matrix, and the matrix may be obtained after the camera has been completely installed and then calibrated. Accordingly, the human-face coordinate detected in the camera coordinate system, after converted into the screen coordinate system, is Pw=T*Pc.

As shown in FIG. 10, when a human face has been detected, the human-face area undergoes eye identification by using the landmark feature, the left and right eyes are marked, and the positions of the left and right eyes in the human-face coordinate system are calculated. Subsequently, by using the above converting formula, the coordinates of the human eyes in the screen coordinate system are calculated. As shown in FIG. 14, according to the positions of the human eyes in the screen coordinate system and the spacial area of the viewpoints in the screen coordinate system, the viewpoint mark numbers corresponding to each of the eyes and the viewpoint mark number corresponding to the center of the two eyes may be obtained, and the corresponding viewpoint-position combination is found according to the viewpoint mark numbers.

Step 1013: by using an image collecting device, re-acquiring a second user image.

Step 1014: when a similarity between the second user image and the first user image is greater than a similarity threshold, performing human-face identification to the second user image, to update the viewpoint-position combinations.

In an embodiment of the present disclosure, the human-face positions in the currently detected second user image and the first user image detected in the previous one frame are compared. Firstly, the human-face quantities are compared. If the quantities are equal, then subsequently the initial coordinates of the human faces at the corresponding positions and the mean square errors of the pixels within the areas occupied by the human faces are compared. If the errors are within a reasonable threshold, then that indicates that the human faces are the same as the human-face data of the previous one frame, and accordingly the human-face data employ the data of the previous one frame of the first user image. If no, that indicates that the human-face data require updating. That cannot only reduce the data calculation amount, but also may reduce the jittering of the displayed multi-viewpoint video caused by the error of the collection.

Figure 15:
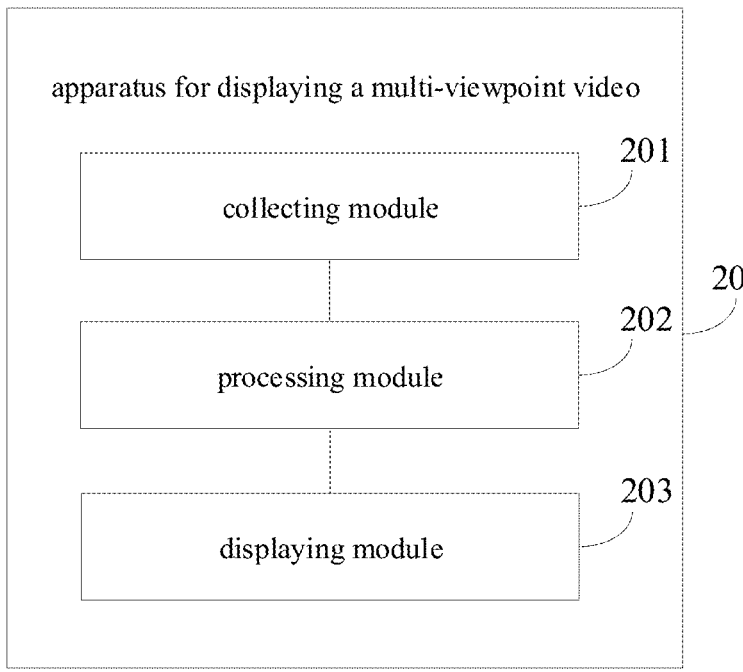
FIG. 15 schematically shows a schematic structural diagram of an apparatus for displaying a multi-viewpoint video according to some embodiments of the present disclosure.

FIG. 15 schematically shows a schematic structural diagram of an apparatus 20 for displaying a multi-viewpoint video according to the present disclosure. the apparatus includes:

a collecting module 201 configured for acquiring different viewpoint-position combinations of at least two users located within a visible area of a screen;

a processing module 202 configured for, from a predetermined multi-viewpoint-image set, screening out multi-viewpoint images corresponding to each of viewpoint-position combinations;

regarding visible viewpoint images of at least the corresponding viewpoint-position combinations among the multi-viewpoint images as target viewpoint images; and combining the target viewpoint images of at least two viewpoint-position combinations as video frames, to obtain the multi-viewpoint video; and a displaying module 203 configured for displaying the multi-viewpoint video by using the screen.

Optionally, each of the viewpoint-position combinations includes: a left-eye viewpoint position and a right-eye viewpoint position; and the processing module 202 is further configured for:

determining, among the multi-viewpoint images, a left-eye viewpoint image corresponding to the left-eye viewpoint position, and a right-eye viewpoint image corresponding to the right-eye viewpoint position;

in the multi-viewpoint image, replacing a viewpoint image located at a viewpoint position on the left of the left-eye viewpoint position with the left-eye viewpoint image, and replacing a viewpoint image located at a viewpoint position on the right of the right-eye viewpoint position with the right-eye viewpoint image, to obtain a source-material multi-viewpoint image; and regarding visible viewpoint images of at least the corresponding viewpoint-position combinations in the source-material multi-viewpoint image as the target viewpoint images.

Optionally, the processing module 202 is further configured for:

replacing, in the source-material multi-viewpoint image, a viewpoint image located between the left-eye viewpoint position and the right-eye viewpoint position with the right-eye viewpoint image or the left-eye viewpoint image.

Optionally, the processing module 202 is further configured for:

replacing a visible viewpoint image of a viewpoint-position combination other than the corresponding viewpoint-position combinations in the source-material multi-viewpoint image with a predetermined hidden image, to obtain the target viewpoint images.

Optionally, the processing module 202 is further configured for:

sequentially alternately combining the target viewpoint images of the at least two viewpoint-position combinations as the video frames, to obtain multi-viewpoint video frames.

Optionally, the processing module 202 is further configured for:

regarding the target viewpoint image of an n-th viewpoint-position combination as an $(N+(n-1))$-th video frame, wherein N is a positive integer less than M, n is a positive integer less than m, M is a refresh rate of the screen, and m is a quantity of the viewpoint-position combinations.

Optionally, the processing module 202 is further configured for:

according to the quantity n of the viewpoint-position combinations, adjusting the refresh rate of the screen.

Optionally, the collecting module 201 is further configured for:

by using an image collecting device, acquiring a first user image within the visible area of the screen; and identifying human faces in the first user image, to obtain viewpoint-position combinations corresponding to eyeballs of the at least two users.

Optionally, the collecting module 201 is further configured for:

by using an image collecting device, re-acquiring a second user image; and when a similarity between the second user image and the first user image is greater than a similarity threshold, performing human-face identification to the second user image, to update the viewpoint-position combinations.

In the embodiments of the present disclosure, by, according to the acquired viewpoint-position combinations of at least two users, screening from the predetermined multi-viewpoint-image set the target viewpoint images that are visible at the viewpoint positions where the users are located, combining the target viewpoint images that are visible by the different users as the video frames to obtain the multi-viewpoint video, and displaying the multi-viewpoint video, the multiple users located at the different viewpoint positions may watch the multi-viewpoint video of a 3D effect simultaneously by using the same one screen, and the users are not required to separately watch the multi-viewpoint video by using the screen, which increases the efficiency of the usage of the multi-viewpoint video.

The above-described device embodiments are merely illustrative, wherein the units that are described as separate components may or may not be physically separate, and the components that are displayed as units may or may not be physical units; in other words, they may be located at the same one location, and may also be distributed to a plurality of network units. Some or all of the modules may be selected according to the actual demands to realize the purposes of the solutions of the embodiments. A person skilled in the art may understand and implement the technical solutions without paying creative work.

Figure 16:
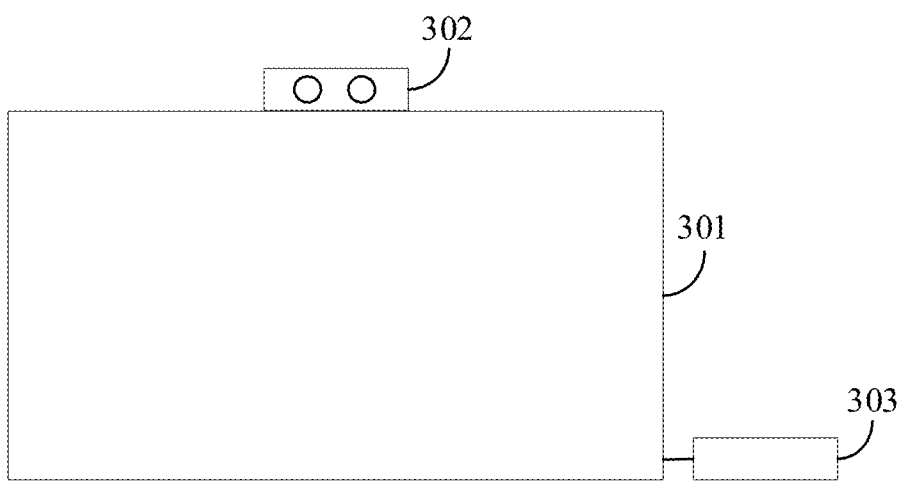
FIG. 16 schematically shows a schematic structural diagram of a displaying device according to some embodiments of the present disclosure.

FIG. 16 shows a schematic structural diagram of a displaying device according to some embodiments of the present disclosure. The displaying device includes: a cylindrical-lens screen 301, a camera 302 disposed on the cylindrical-lens screen, and a processor 303;

the camera 302 is configured for photographing within a visible area of the cylindrical-lens screen, and sending a photographed user image to the processor;

the processor 303 is configured for, based on the user image, executing steps of the method for displaying a multi-viewpoint video stated above, to obtain the multi-viewpoint video; and the cylindrical-lens screen 301 is configured for displaying the multi-viewpoint video.

In the embodiments of the present disclosure, by, according to the acquired viewpoint-position combinations of at least two users, screening from the predetermined multi-viewpoint-image set the target viewpoint images that are visible at the viewpoint positions where the users are located, combining the target viewpoint images that are visible by the different users as the video frames to obtain the multi-viewpoint video, and displaying the multi-viewpoint video, the multiple users located at the different viewpoint positions may watch the multi-viewpoint video of a 3D effect simultaneously by using the same one screen, and the users are not required to separately watch the multi-viewpoint video by using the screen, which increases the efficiency of the usage of the multi-viewpoint video.

Each component embodiment of the present disclosure may be implemented by hardware, or by software modules that are operated on one or more processors, or by a combination thereof. A person skilled in the art should understand that some or all of the functions of some or all of the components of the computing and processing device according to the embodiments of the present disclosure may be implemented by using a microprocessor or a digital signal processor (DSP) in practice. The present disclosure may also be implemented as apparatus or device programs (for example, computer programs and computer program products) for implementing part of or the whole of the method described herein. Such programs for implementing the present disclosure may be stored in a non-transient computer-readable medium, or may be in the form of one or more signals. Such signals may be downloaded from an Internet website, or disposed on a carrier signal, or provided in any other forms.

Figure 17:
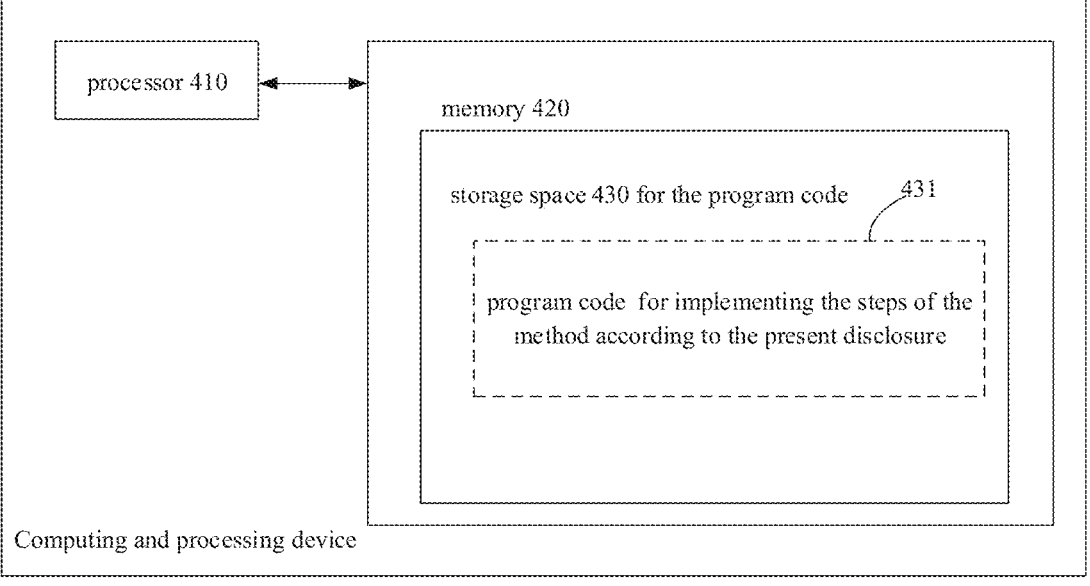
FIG. 17 schematically shows a block diagram of a computing and processing device for implementing the method according to some embodiments of the present disclosure.
Figure 18:
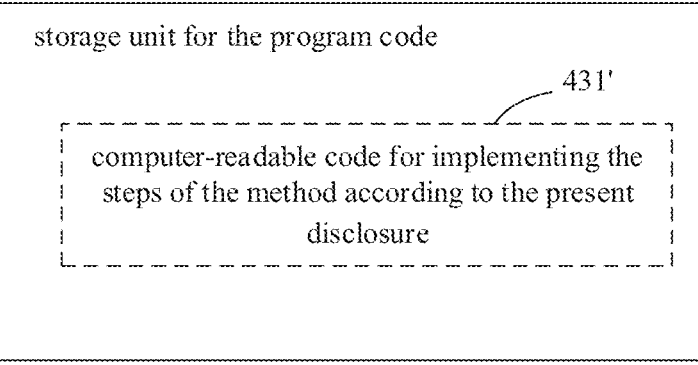
FIG. 18 schematically shows a storage unit for maintaining or carrying a program code for implementing the method according to some embodiments of the present disclosure.

For example, FIG. 17 shows a computing and processing device that may implement the method according to the present disclosure. The computing and processing device traditionally includes a processor 410 and a computer program product or non-transient computer-readable medium in the form of a memory 420. The memory 420 may be electronic memories such as flash memory, EEPROM (Electrically Erasable Programmable Read Only Memory), EPROM, hard disk or ROM. The memory 420 has the storage space 430 of the program code 431 for implementing any steps of the above method. For example, the storage space 430 for program code may contain program codes 431 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 18. The storage unit may have storage segments or storage spaces with similar arrangement to the memory 420 of the computing and processing device in FIG. 17. The program codes may, for example, be compressed in a suitable form. Generally, the storage unit contains a computer-readable code 431', which may be read by a processor like 410. When those codes are executed by the computing and processing device, the codes cause the computing and processing device to implement each of the steps of the method described above.

It should be understood that, although the steps in the flow charts in the drawings are shown sequentially according to the indication by the arrows, those steps are not necessarily performed sequentially according to the sequence indicated by the arrows. Unless expressly described herein, the sequence of the performances of those steps are not strictly limited, and they may be performed in other sequences. Furthermore, at least some of the steps in the flow charts in the drawings may include a plurality of sub-steps or a plurality of stages, wherein those sub-steps or stages are not necessarily completely performed at the same one moment, but may be performed at different moments, and their performance sequence is not necessarily sequential performance, but may be performance alternate with at least some of the other steps or the sub-steps or stages of the other steps.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it may be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail with reference to the above embodiments, a person skilled in the art should understand that he may still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A method for displaying a multi-viewpoint video, wherein the method comprising:
   acquiring different viewpoint-position combinations of at least two users located within a visible area of a screen;
   from a predetermined multi-viewpoint-image set, screening out multi-viewpoint images corresponding to each of viewpoint-position combinations;
   regarding visible viewpoint images of at least the corresponding viewpoint-position combinations among the multi-viewpoint images as target viewpoint images;
   combining the target viewpoint images of at least two viewpoint-position combinations as video frames, to obtain the multi-viewpoint video; and
   displaying the multi-viewpoint video by using the screen, wherein
   each of the viewpoint-position combinations comprises a left-eye viewpoint position and a right-eye viewpoint position, the step of combining the target viewpoint images of the at least two viewpoint-position combinations as the video frames, to obtain the multi-viewpoint video comprises:

determining, among the multi-viewpoint images, a left-eye viewpoint image corresponding to the left-eye viewpoint position, and a right-eye viewpoint image corresponding to the right-eye viewpoint position;

in the multi-viewpoint image, replacing a viewpoint image located at a viewpoint position on the left of the left-eye viewpoint position with the left-eye viewpoint image, and replacing a viewpoint image located at a viewpoint position on the right of the right-eye viewpoint position with the right-eye viewpoint image, to obtain a source-material multi-viewpoint image; and regarding visible viewpoint images of at least the corresponding viewpoint-position combinations in the source-material multi-viewpoint image as the target viewpoint images, after the step of obtaining the source-material multi-viewpoint image, the method further comprises replacing, in the source-material multi-viewpoint image, a viewpoint image located between the left-eye viewpoint position and the right-eye viewpoint position with the right-eye viewpoint image or the left-eye viewpoint image, the step of regarding the visible viewpoint images of at least the corresponding viewpoint-position combinations in the source-material multi-viewpoint image as the target viewpoint images comprises replacing a visible viewpoint image of a viewpoint-position combination other than the corresponding viewpoint-position combinations in the source-material multi-viewpoint image with a predetermined hidden image, to obtain the target viewpoint images, the step of acquiring the different viewpoint-position combinations of the at least two users located within the visible area of the screen comprises:

by using an image collecting device, acquiring a first user image within the visible area of the screen; and identifying human faces in the first user image, to obtain viewpoint-position combinations corresponding to eyeballs of the at least two users, and after the step of obtaining the viewpoint-position combinations corresponding to the eyeballs of the at least two users, the method further comprises:

by using the image collecting device, re-acquiring a second user image; and when a similarity between the second user image and the first user image is greater than a similarity threshold, performing human-face identification to the second user image, to update the viewpoint-position combinations.

2. The method according to claim 1, wherein the step of combining the target viewpoint images of the at least two viewpoint-position combinations as the video frames, to obtain the multi-viewpoint video comprises:

sequentially alternately combining the target viewpoint images of the at least two viewpoint-position combinations as the video frames, to obtain multi-viewpoint video frames.

3. The method according to claim 2, wherein the step of sequentially alternately combining the target viewpoint images of the at least two viewpoint-position combinations as the video frames, to obtain the multi-viewpoint video frames comprises:

regarding the target viewpoint image of an n-th viewpoint-position combination as an $(N+(n-1))$-th video frame, wherein N is a positive integer less than M, n is a positive integer less than m, M is a refresh rate of the screen, and m is a quantity of the viewpoint-position combinations.

4. The method according to claim 3, wherein after the step of acquiring the different viewpoint-position combinations of the at least two users located within the visible area of the screen, the method further comprises:

according to the quantity n of the viewpoint-position combinations, adjusting the refresh rate of the screen.

5. A displaying device, wherein the displaying device comprises: a cylindrical-lens screen, a camera disposed on the cylindrical-lens screen, and a processor;

the camera is configured for photographing within a visible area of the cylindrical-lens screen, and sending a photographed user image to the processor;

the processor is configured for, based on the user image, executing steps of the method for displaying a multi-viewpoint video according to claim 1, to obtain the multi-viewpoint video; and the cylindrical-lens screen is configured for displaying the multi-viewpoint video.

6. The displaying device according to claim 5, wherein the step of combining the target viewpoint images of the at least two viewpoint-position combinations as the video frames, to obtain the multi-viewpoint video comprises:

sequentially alternately combining the target viewpoint images of the at least two viewpoint-position combinations as the video frames, to obtain multi-viewpoint video frames.

7. The displaying device according to claim 6, wherein the step of sequentially alternately combining the target viewpoint images of the at least two viewpoint-position combinations as the video frames, to obtain the multi-viewpoint video frames comprises:

regarding the target viewpoint image of an n-th viewpoint-position combination as an $(N+(n-1))$-th video frame, wherein N is a positive integer less than M, n is a positive integer less than m, M is a refresh rate of the screen, and m is a quantity of the viewpoint-position combinations.

8. The displaying device according to claim 7, wherein after the step of acquiring the different viewpoint-position combinations of the at least two users located within the visible area of the screen, the method further comprises:

according to the quantity n of the viewpoint-position combinations, adjusting the refresh rate of the screen.

9. A non-transient computer-readable storage medium, having stored thereon computer executable instructions, which when executed by a processor cause the processor to perform the method for displaying a multi-viewpoint video according to claim 1.

* * * * *